United States Patent [19]

Flory

[11] Patent Number: 5,611,636

[45] Date of Patent: Mar. 18, 1997

[54] TENSION MEMBER TERMINATION WITH SEGMENTED POTTING SOCKET AND CENTRAL PASSAGE

[76] Inventor: John F. Flory, 4 Tower La., Morristown, N.J. 07960

[21] Appl. No.: 438,354

[22] Filed: May 10, 1995

Related U.S. Application Data

[63] Continuation-in-part of Ser. No. 90,771, Jul. 13, 1993, Pat. No. 5,415,490.

[51] Int. Cl.⁶ .................................................. F16G 11/00
[52] U.S. Cl. ........................ 403/269; 403/268; 24/122.6
[58] Field of Search .................................. 403/265, 267, 403/268, 269; 24/122.6

[56] References Cited

U.S. PATENT DOCUMENTS

| | | | |
|---|---|---|---|
| 1,577,003 | 3/1926 | Sunderland | 403/268 |
| 2,686,963 | 8/1954 | Freyssinet | 24/122.6 |
| 2,934,364 | 4/1960 | Conversy | 403/275 |
| 3,267,539 | 8/1966 | Mark . | |
| 3,328,229 | 6/1967 | Windecker | 403/267 |
| 3,409,551 | 11/1968 | Treat . | |
| 3,409,951 | 11/1968 | Morieras | 24/122.6 |
| 3,468,569 | 9/1969 | Ballard et al. | 403/267 |
| 3,507,949 | 4/1970 | Campbell | 403/267 |
| 3,570,074 | 3/1971 | Schimmeyer et al. | 403/267 |
| 3,600,765 | 8/1971 | Rovinsky | 24/122.6 |
| 3,660,887 | 5/1972 | Davis | 403/268 |
| 3,739,457 | 6/1973 | Davis | 403/275 |
| 4,200,768 | 4/1980 | Anhalt et al. | 403/267 |
| 4,279,531 | 7/1981 | McKenzie | 403/267 |
| 4,295,250 | 10/1981 | Dupuy | 403/268 |
| 4,459,722 | 7/1984 | Dziedzic et al. . | |
| 4,557,007 | 12/1985 | Dalguji et al. | 14/22 |
| 4,596,485 | 6/1986 | Murtagh . | |
| 5,315,066 | 5/1994 | Spiteri, Jr. | 403/268 |

FOREIGN PATENT DOCUMENTS

| | | |
|---|---|---|
| 838057 | 6/1960 | United Kingdom . |
| 1020432 | 2/1966 | United Kingdom . |
| 1056990 | 2/1967 | United Kingdom . |
| 1244275 | 8/1971 | United Kingdom . |
| 1300265 | 12/1972 | United Kingdom . |
| 2091770 | 8/1982 | United Kingdom . |

OTHER PUBLICATIONS

United Ropeworks (USA) Inc., Technical Bulletin, 356, "Potting Procedure: Phillystran HPTG", (Jan. 1989).
Crosby Group Inc. Catalog (1987), p. 33, Open and Closed Spelter Sockets.
United Ropeworks (USA) Inc., Technical Bulletin, 109, "Socketfast Blue", (Jun. 1985).
United Ropeworks (USA) Inc. Bulletin, 120, "Phillystran End Terminations", (May 1987).

Primary Examiner—Anthony Knight

[57] ABSTRACT

An improved termination for the end of a cable or other flexible tension member, in which the fibers or other load-carrying elements (4) of the flexible tension member (2) are encapsulated in resinous material (70) to form plugs (74) with annular cavity segments (62) formed by an insert (30) comprised of a sleeve (32) having radial plates (44). Some of the tension member elements are encapsulated within a central passage (36) through the sleeve. Alternatively, non-load-carrying components (92) of the flexible tension member (2) are housed within a central passage (96) through a cylindrical sleeve (94) to prevent them from becoming encapsulated.

16 Claims, 2 Drawing Sheets

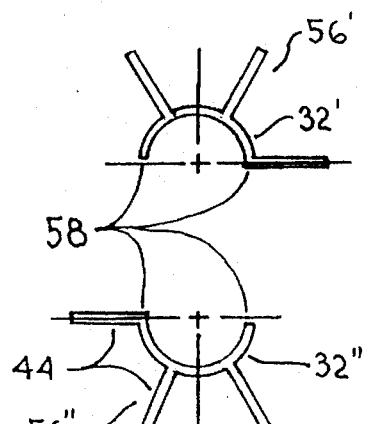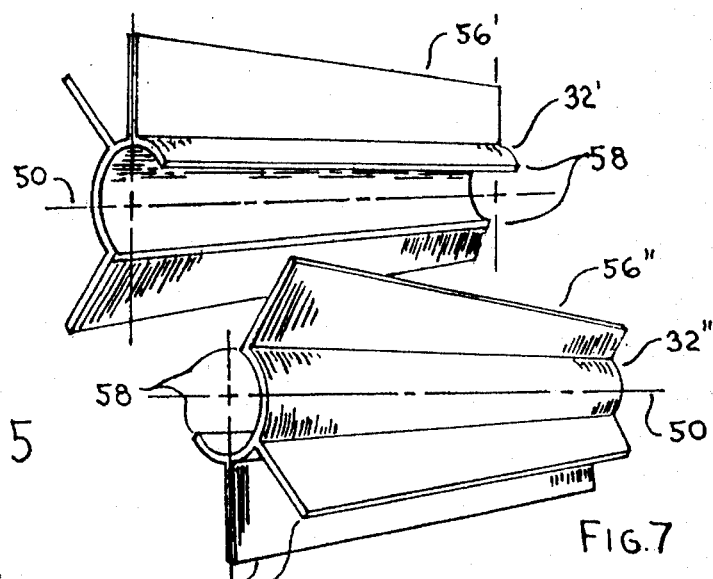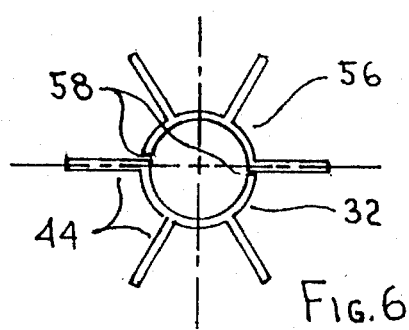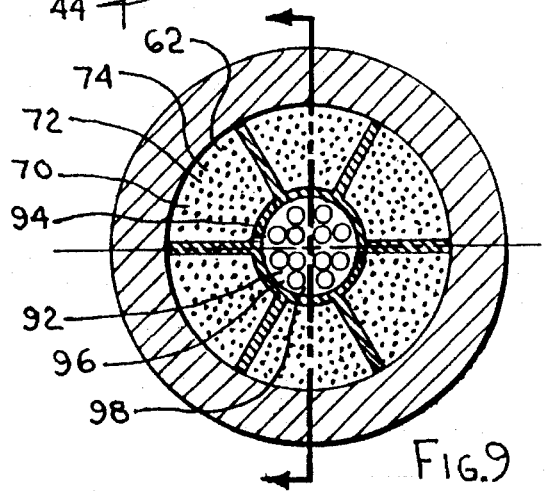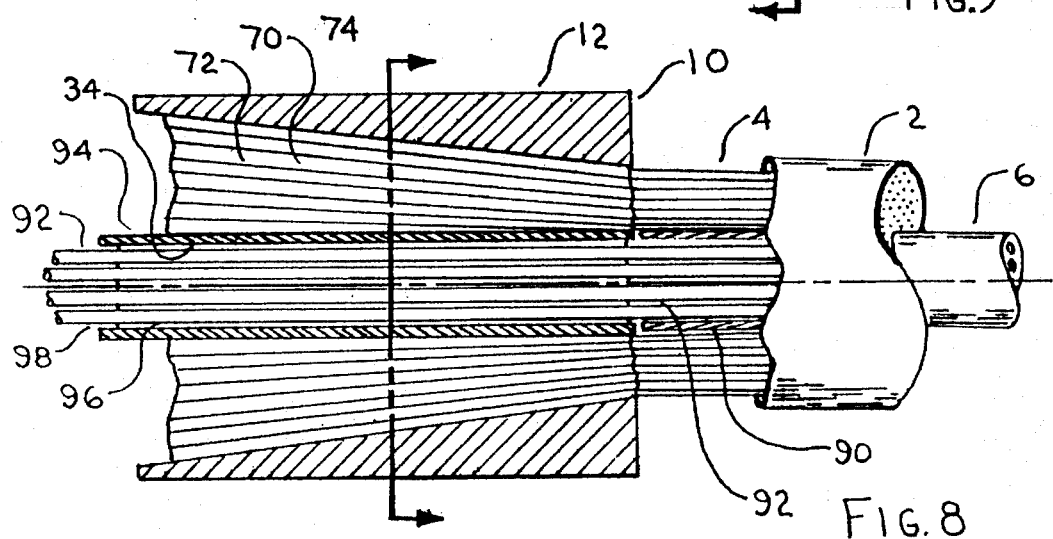

TENSION MEMBER TERMINATION WITH SEGMENTED POTTING SOCKET AND CENTRAL PASSAGE

CROSS-REFERENCE TO RELATED APPLICATION

This is a continuation-in-part of Ser. No. 08/090.771 "Rope Termination with Constant-Cross-Section, Divided-Cavity Potted Socket" filed by John F. Flory on Jul. 13, 1993, now U.S. Pat. No. 5,415,490.

BACKGROUND—FIELD OF INVENTION

This invention relates to an improved termination for the end of a cable or other flexible tension member in which the fibers or other tension-carrying elements of the flexible tension member are encapsulated in resinous material to form a plug within a socket cavity.

BACKGROUND—DESCRIPTION OF PRIOR ART

Flexible tension members are commonly terminated in potted sockets. The fibers or other tension elements which comprise the tension member are untwisted or unbraided and then broomed or flared. The broomed fibers are placed within a tapered cavity in a potting socket barrel. There they are filled, mixed, and encapsulated with a resinous material, which then sets and hardens. The resulting fiber-and-resinous-material plug is essentially a composite material which resists pullout from the barrel cavity.

My patent application Ser. No. 08/090.771, "Rope Termination with Constant-Cross-Section, Divided-Cavity Potted Socket" describes as improved termination for a flexible tension member in which an insert with radial plates is placed within a tapered socket to form cavity segments. The ends of the fibers or other tension member elements are placed within these cavity segments and then encapsulated in resinous material to form plugs which are smaller than the major socket cavity. Dividing the major socket cavity into cavity segments in this manner serves to reduce the cross-section areas of the fiber-and-resinous-material mixture and thus improves its strength efficiency.

In that invention, if the flexible tension member has a central tension-carrying core, it is necessary to either cut out that tension-carrying core or to divide it up and place portions of it in each of several of the cavity segments. Also, that invention makes no provision to extend a non-tension component of the flexible tension member through the termination without it coming into contact with the resinous material.

Niederer, U.S. Pat. 4,596,485, shows an example of a termination in which a non-tension component of a tension member extends through a hole in an insert. Niederer provides resinous material to hold the tension-carrying elements within the annular space between the insert and the cavity wall. However, Niederer does not provide a means of centering that insert within the annular cavity. Another drawback of Niederer is that the non-tension component must be threaded through the hole in the insert. Yet another drawback of Niederer is that the fiber-and-resinous-material plug is not divided into small segments to improve the strength efficiency of the termination.

Examples of terminations in which a central tension-carrying element of a tension member is passed through a split central insert are shown by Mark, U.S. Pat. No. 3,267,539 and Dziedzic, U.S. Pat. 4,459,722. However, in these patents both the central and the outer tension-carrying elements are held in the termination by gripping action instead of by resin.

OBJECTIVE AND ADVANTAGES

In a potted socket termination for a flexible tension member comprising a barrel with a cavity, the objectives and advantages of the present invention are:

a) To provide a sleeve with a central passage to house a core of the flexible tension member.

b) To provide a means of aligning that sleeve along the axis of the barrel cavity c) To divide the annular cavity around the sleeve into a number of smaller cavities to increase the strength efficiency of the termination.

d) To provide a simple means of placing the core into that central passage.

e) To provide a tapered central passage in which elements of the core can be encapsulated in resin to form a plug f) Alternatively to permit components in the core of the flexible tension member to pass through the potted socket barrel without becoming encapsulated in the resin used to encapsulate outer elements of the flexible tension member.

BRIEF DESCRIPTION OF THE DRAWINGS

FIG. 5 is an end view of two sections of a sleeve with radial plates separated to facilitate placement about a tension member core.

FIG. 6 is an end view of the two sections of a sleeve with radial plates of FIG. 5 joined together to form a complete sleeve.

FIG. 7 is a view of a sleeve with radial plates separated into two sections to facilitate placement about a center tension member element.

FIG. 8 is a longitudinal cross-section through a tapered socket with an alternative sleeve and radial plate insert centered Within the socket, showing tension-carrying elements of the tension member encapsulated within resin in the cavity segments formed by the radial plates, and showing non-tension components of the tension member passing through the central passage within the insert.

FIG. 9 is a transverse cross-section through the mouth of the tapered socket of FIG. 8 with the alternate sleeve and radial plate insert centered within the socket, showing tension-carrying elements of the tension member encapsulated within resin in the cavity segments formed by the radial plates, and showing non-tension components of the tension member passing through the central passage within the insert.

NOMENCLATURE

2—Tension member
4—Tension-carrying outer elements
6—Tension member core
8—Tension-carrying core elements
10—Potting socket
12—Socket barrel
14—Barrel inner surface
16—Barrel cavity
18—Cavity axis
20—Barrel mouth end
22—Barrel back end
24—Attachment lug
30—Insert
32—Insert sleeve
34—Sleeve inner surface
36—Insert central passage
38—Insert passage mouth end
40—Insert passage back end
42—Sleeve outer surface
44—Radial plate
46—Plate side surface
48—Plate outer edge
50—Insert axis
52—Sleeve holes
54—Plate holes
56—Split sleeve insert
58—Sleeve seam
60—Annular cavity
62—Annular cavity segment
70—Resinous material
72—Fiber-and-resinous-material mixture
74—Annular-segment fiber-and-resinous-material plug
76—Annular-segment plug mouth end
78—Annular-segment plug back end
80—Insert-passage fiber-and-resinous-material plug
90—Tension member center conduit
92—Non-tension components
94—Cylinder sleeve
96—Insert central through passage
98—Sealant

DETAILED DESCRIPTION OF THE INVENTION

Basic Configuration

Refer to FIGS. 1, 2, 3 and 4 which show a potted socket termination featuring an insert with radial plates and a central passage.

Figure 2:
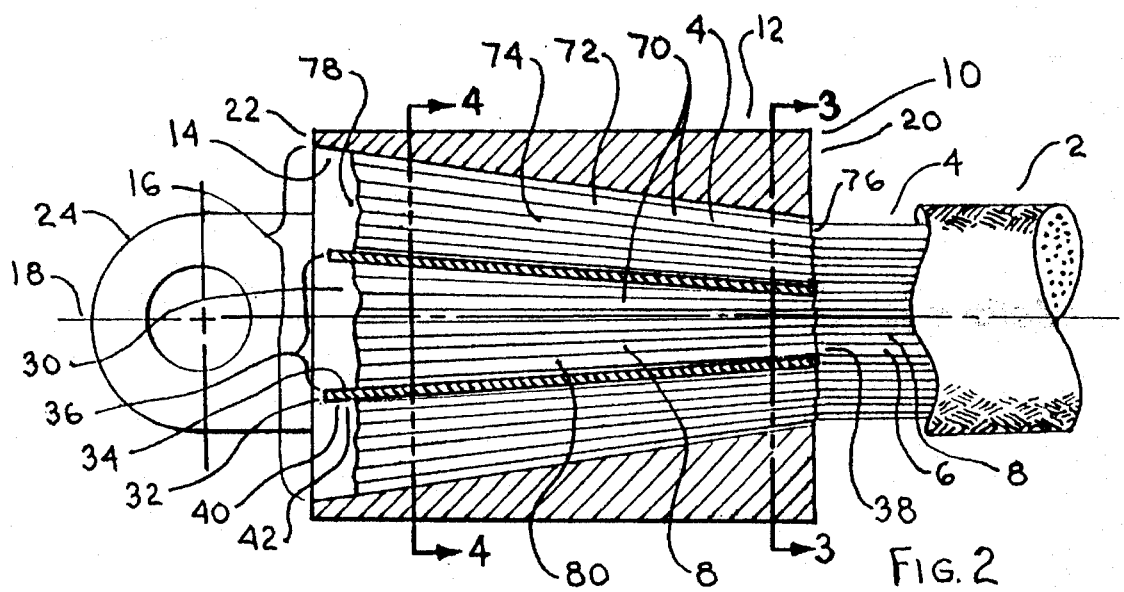
FIG. 2 is a longitudinal cross-section through a tapered socket, showing the sleeve and radial plate insert of FIG. 1 centered within the socket and with tension-carrying elements of the tension member broomed out and encapsulated within resin in the cavity segments formed by the radial plates as well as within the center passage of the sleeve.

FIG. 2 is a longitudinal cross-section through the potted socket termination featuring an insert with radial plates and a central passage. A tension member 2 is comprised of many components. These include tension-carrying outer elements 4 and a core 6. Typically, the core consists of tension-carrying core elements 8. Generally these tension-carrying elements 4 and 6 are fibers, yarns, strands, or wires. The terms elements and fibers may be used interchangeably in this description.

A potting socket 10 consists of a barrel 12. Barrel 12 is usually made of metal but may be made of other suitable material. Barrel 12 is hollow, having an inner surface 14 which defines a barrel cavity 16. Barrel cavity 16 is symmetrical about cavity axis 18. Barrel cavity 16 is narrower at the mouth end 20 than at the back end 22 of the barrel 12. Potting socket 10 may be provided with attachment lugs 24 at the back end 22 or may have other means of attachment to a fixed point or another object not shown.

Figure 1:
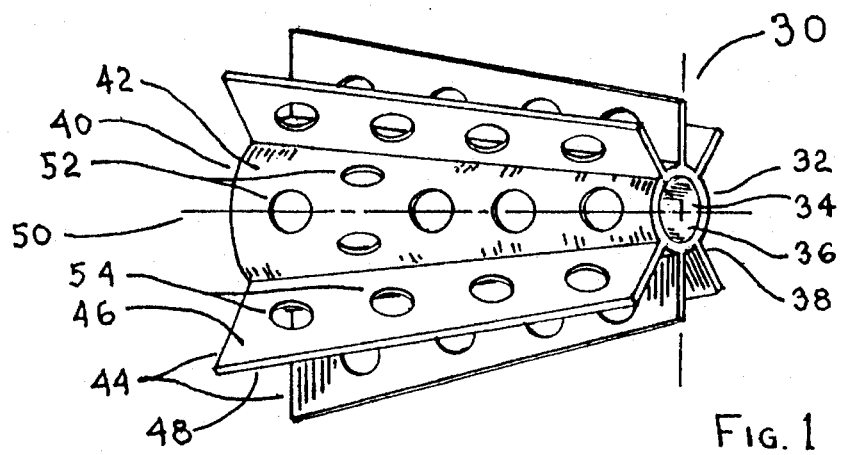
FIG. 1 is an insert sleeve with a central passage and with radial plates designed to center the sleeve within a potting socket and to partition the fiber-and-resinous-material-mixture plug within a tapered socket

An insert 30, shown in FIG. 1, consists of a sleeve 32 having a sleeve inner surface 34 and a sleeve outer surface 42. Insert 30 is usually made of metal but may be made of other suitable material. The sleeve inner surface 34 forms a central passage 36 which extends the length of the sleeve 32.

Radial plates 44 are attached to and extend radially outward from sleeve outer surface 42. Each radial plate 44 has plate side surfaces 46 and a plate outer edge 48. The plate outer edges 48 are shaped to essentially conform to the shape of the barrel inner surface 14 when insert 30 is assembled within socket barrel 12.

Figures 3, 4:
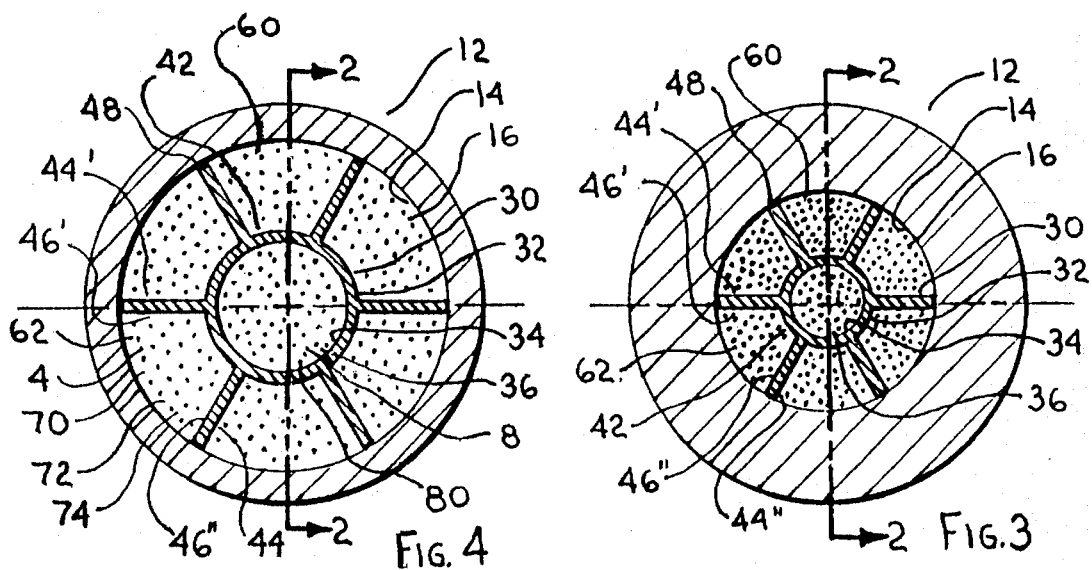
FIG. 3 is a transverse cross-section through the mouth of the tapered socket of FIG. 2, showing the sleeve and radial plate insert of FIG. 1 centered within the cavity, and showing elements of the tension member encapsulated within resin in the cavity segments formed by the radial plates as well as within the center passage of the sleeve.
FIG. 4 is a transverse cross-section through the back of the potted socket of FIG. 2, showing the sleeve and radial plate insert of FIG. 1 centered within the cavity.

Insert 30 has a principal axis 50. When insert 30 is placed within socket barrel 12, the radial plates 44 serve to position the insert axis 50 along the barrel cavity axis 18. Thus the insert sleeve 32 is centered within the socket cavity 12, as shown in FIGS. 3 and 4.

When insert 30 is placed within socket barrel 12, the sleeve outer surface 42 and the barrel inner surface 14 form an annular cavity 60. The plate side surfaces 46' and 46" of adjacent plates 44' and 44" respectively, the sleeve outer surface 42 between these plates, and the barrel inner surface 14 between these plates form an annular cavity segment 62. FIG. 3 shows the cross section of this annular cavity segment 62 at the barrel mouth end 20. FIG. 4 shows the cross section of this annular cavity segment 62 at the barrel back end 22.

Assembly Method

When assembling the potted socket termination, an end of the tension member 2 is passed through the barrel cavity 16 such that the end extends beyond the barrel back end 22. Any jacket is removed from the tension member 2 and from the tension member core 6. The tension member is disassembled down to its basic components. The tension-carrying outer elements 4 and the tension-carrying core elements 6 are untwisted or unbraided and are broomed or flared out, essentially separating and exposing each element.

The elements are then placed in association with the insert 30. The tension-carrying core elements 8 are placed through the insert central passage 36. The tension-carrying outer elements 4 are divided into bundles corresponding to the number of radial plates 44, and a bundle is placed between each pair of plates around the sleeve outer surface 42.

The end of the termination 2 and the insert 30 are now drawn back into the barrel cavity 16, such that the plate outer edges 48 essentially rest against the barrel inner surface 14.

A resinous material 70 in liquid state is then poured into the insert central passage 36 and into each of the annular cavity segments 62. This resinous material 70 flows among and mixes with said tension-carrying outer elements 4. When this resinous material 70 hardens, it combines with said tension-carrying outer elements 4 to form a fiber-and-resinous-material mixture 72 which essentially has the properties of a composite material.

The term resinous material is not limited here to the general family of castable synthetic polymer resins. The term resinous material is intended here to refer to any material which can be cast, poured or injected in a liquid state and which will then set to a solid state. Examples of such materials include thermoplastics, thermosets, elastomers, and metals. The terms fiber and tension element are generally used here interchangeably and are not limited here to the general family of polymer filaments. The term fiber is intended here to refer to any long, thin element capable of carrying a tensile load and of being combined with resinous material to form a composite material. Examples of such long, thin elements are fibers, wires, and carbon rods.

Within each cavity segment 62, the fiber-and-resinous-material mixture 72 forms an annular-segment fiber-and-resinous-material plug 74 which has the shape of the cavity segment. Because the annular segment plug mouth end 76 is smaller than the annular-segment plug back end 78, each cavity segment plug 74 resists being pulled out of the barrel cavity 16.

FIG. 2 shows the preferred embodiment, in which the central passage 36 through the insert 30 is larger at the mouth end 38 than at the back end 40. Within the central passage 36, the fiber-and resinous material mixture 72 forms an insert-passage fiber-and-resinous-material plug 80. Because the insert central passage 36 is smaller at the mouth end 38 than at the back end 40, the insert-passage plug 80 resists being pulled out of the central passage.

Holes 52 may be provided in the sleeve 32 to facilitate passage of liquid resinous material between the central passage 36 and the annular-cavity segments 62. Holes 54 may be provided through the radial plates 44 to facilitate passage of liquid resinous material between the annular-cavity segments 62. Such holes will help assure complete and uniform penetration of the liquid resinous material among the tension member elements before the resinous material hardens.

Split Sleeve Enhancement

FIGS. 5, 6, and 7 show a further enhancement, in which the insert sleeve 32 is divided into several sections to facilitate assembly.

FIG. 5 shows an end view of a split sleeve insert 56 in which the sleeve 32 is split into two sections 32' and 32" by seams 58. The split sleeve insert 56 can thus be separated into two sections 56' and 56". When these sections are joined together, they form a complete sleeve 32 as shown in FIG. 6.

FIG. 7 is a three-quarter view of this split sleeve insert 56. During assembly, the two split sleeve insert sections 56' and 56" are separated and placed around the tension-carrying core elements 8 of a tension member 2. The split sleeve insert sections 56' and 56" are then reassembled to form a complete split sleeve insert 56, which is then placed within the barrel cavity 16 as described above. An adhesive or a binding strap, not shown, may be used to temporarily hold the split sleeve insert sections 56' and 56" together during assembly.

Protected Core Component Alternative

FIGS. 8 and 9 show an alternate embodiment, in which non-tension components 92 are carried through the termination.

FIG. 8 is a longitudinal cross section through a potting socket 10 on a tension member 2 which contains a center conduit 90. This conduit 90 may containing non-tension-carrying components 92, such as electrical conductors, communication wires, optical fibers, or fluid carrying tubes. The center conduit 90 is surrounded by tension-carrying outer elements 4.

The components 92 are placed within the central passage 36 of the insert 30. Here it may be preferred that the insert sleeve 32 be a constant cross-section cylinder sleeve 94. Also, here it may be preferred that the insert sleeve 32 not be provided with holes in order that resinous material 70 is prevented from contacting components 92.

The sleeve inner surface 32 forms an insert central through passage 96 which permits the components 92 to extend beyond the insert passage back end 40. After the components 92 are placed through the insert central through passage 96, the passage may be filled with sealant 98.

FIG. 9 is a transverse cross section through the potted socket termination of FIG. 8. The radial plates 44 serve to center the cylinder sleeve 94 within the barrel cavity 16. The non-tension components 92 pass through this cylinder sleeve 94 and may be protected by sealant 98.

In this alternative arrangement, the cylinder sleeve 94 prevents the resinous material 70 from contacting the non-tension components 92. Thus tension applied to the tension member 6 is not directly applied to the non-tension components 92. The non-tension components 92 pass completely through the potting socket 10, extend beyond the barrel back end 22, and may connect to instrumentation, power sources, or other operable systems not shown.

CONCLUSION

This invention is a termination for a tension member comprising: a socket barrel, a cavity peripheral wall forming a major cavity within this barrel and substantially symmetrical about a principal cavity axis, a sleeve within this major cavity, an interior peripheral wall within this sleeve forming a central passage through this sleeve and substantially symmetrical about a principal sleeve axis, at least one central component of the tension member extending into this central passage, an exterior peripheral wall on this sleeve, a plurality of plates attached to and extending radially outward from this sleeve exterior peripheral wall substantially to the cavity peripheral wall, these radial plates positioning the principal sleeve axis substantially along the principal cavity axis and dividing the major cavity into a plurality of minor cavity segments, a plurality of broomed out elements of the tension member extending into each of these minor cavity segments, resinous material inserted into these minor cavity segments and forming a mixture with the tension member elements, and this mixture of tension member elements and resinous material forming plugs within these minor cavity elements when the resinous material becomes hard.

This invention further comprises: a plurality of broomed out central elements of the tension member extend into the central passage, resinous material inserted into this central passage and forming a mixture with these tension member elements, and this mixture of tension member elements and resinous material forming a plug within this central passage when the resinous material becomes hard.

This invention further comprises: holes in the sleeve such that the resinous material can communicate between the central passage and the minor cavity segments, and holes in the radial plates such that this resinous material can communicate between these minor cavity segments.

This invention further comprises: the sleeve divided into a plurality of sections, such that it may be separated and reassembled to enclose the central component.

Alternatively, this invention further comprises: at least one central component of the flexible tension member extending completely through the central passage without combining with resinous material.

The combination of features described above are new, novel, and unobvious. The combinations of features described above have not been described in any prior art patents or other publications nor used before.

It will be obvious that the various embodiments and details can be combined in other forms to produce the same results. Other modifications can also obviously be made to the particular embodiments while remaining within the intended scope of the following claims. Thus the invention is limited only by the following claims.

I claim:

1. A termination for a tension member comprising:

a socket barrel, a cavity peripheral wall forming a major cavity within said barrel, said major cavity being substantially symmetrical about a principal cavity axis, a sleeve within said major cavity, an interior peripheral wall within said sleeve, said interior peripheral wall forming a central passage in said sleeve, said central passage being substantially symmetrical about a principal sleeve axis, at least one component of said tension member extending into said central passage, an exterior peripheral wall on said sleeve, a plurality of plates attached to said sleeve exterior peripheral wall, said plates extending outward from said sleeve exterior peripheral wall, said plates substantially extending to said cavity peripheral wall, said plates positioning said principal sleeve axis substantially along said principal cavity axis, said plates substantially dividing said major cavity into a plurality of minor cavity segments, a plurality of broomed out elements of said tension member extending into each of said minor cavity segments, resinous material inserted into said minor cavity segments and forming a mixture with said tension member elements, wherein said mixture of tension member elements and resinous material forms plugs within said minor cavity elements when said resinous material becomes hard.

2. The termination of claim 1 wherein:

a plurality of broomed out elements of said tension member extend into said central passage, resinous material is inserted into said central passage and forms a mixture with said tension member elements, and said mixture of tension member elements and resinous material forms a plug within said central passage when said resinous material becomes hard.

3. The termination of claim 2 wherein:

holes are provided in said sleeve, such that said resinous material can communicate between said central passage and said minor cavity segments.

4. The termination of claim 2 wherein:

holes are provided in said radial plates, such that said resinous material can communicate between said minor cavity segments.

5. The termination of claim 1 wherein:

said sleeve is divided into a plurality of sections, such that said sleeve may be separated and reassembled to enclose said central component.

6. The termination of claim 5 wherein:

a plurality of broomed out central elements of said tension member extend into said central passage, resinous material is inserted into said central passage and forms a mixture with said tension member elements, and said mixture of tension member elements and resinous material forms a plug within said central passage when said resinous material becomes hard.

7. The termination of claim 6 wherein:

holes are provided in said sleeve, such that said resinous material can communicate between said central passage and said minor cavity segments.

8. The termination of claim 6 wherein:

holes are provided in said plates, such that said resinous material can communicate between said minor cavity segments.

9. The termination of claim 1 wherein:

said central passage extends through said sleeve, and at least one central component of said flexible tension member extends completely through said central passage.

10. The termination of claim 9 wherein:

said sleeve is divided into a plurality of sections, such that it may be separated and reassembled to enclose said central component.

11. A termination for a tension member comprising:

a socket barrel having a barrel axis and an internal peripheral wall substantially symmetrical about said barrel axis, said barrel internal peripheral wall forming a major cavity within said barrel, an insert sleeve having a sleeve axis, an internal peripheral wall, and an external peripheral wall, each of said sleeve peripheral walls being substantially symmetrical about said sleeve axis, a plurality of plates attached to and extending outward from said sleeve exterior peripheral wall, said sleeve positioned within said barrel cavity such that said plates extend substantially to said barrel internal peripheral wall and said sleeve axis is substantially along said barrel axis, said plates substantially dividing said barrel cavity into a plurality of cavity segments, a plurality of broomed out elements of said tension member extending into each of said cavity segments, resinous material inserted into said cavity segments, combining with said tension member elements, and forming plugs within said cavity segments when said resinous material becomes hard, said sleeve internal peripheral wall forming a central passage within said sleeve, and at least one component of said tension member extending into said central passage.

12. The termination of claim 11 wherein:

a plurality of broomed out elements of said tension member extend into said central passage, and resinous material is inserted into said central passage, combines with said tension member elements, and forms a plug within said central passage when said resinous material becomes hard.

13. The termination of claim 11 wherein:

said sleeve is divided into a plurality of sections, such that said sleeve may be separated and reassembled to enclose said central component.

14. The termination of claim 11 wherein:

said central passage extends through said sleeve, and at least one central component of said flexible tension member extends completely through said central passage.

15. A termination for a tension member comprising:

a socket barrel having a barrel axis and an internal peripheral wall substantially symmetrical about said barrel axis, said barrel internal peripheral wall forming a major cavity within said barrel, an insert sleeve having a sleeve axis, an internal peripheral wall, and an external peripheral wall, each of said sleeve peripheral walls being substantially symmetrical about said sleeve axis, a plurality of plates attached to and extending outward from said sleeve exterior peripheral wall, said sleeve positioned within said barrel cavity such that said plates extend substantially to said barrel internal peripheral wall and said sleeve axis is substantially along said barrel axis, said plates substantially dividing said barrel cavity into a plurality of cavity segments, a plurality of broomed out elements of said tension member extending into each of said cavity segments, resinous material is inserted into said cavity segments, combines with said tension member elements, and forms plugs within said cavity segments when said resinous material becomes hard, said sleeve internal peripheral wall forming a central passage within said sleeve, at least one component of said tension member extending into said central passage, said insert sleeve being divided substantially parallel to said sleeve axis into a plurality of sections, such that said sleeve may be separated and reassembled to enclose said central component.

16. The termination of claim 15 wherein:

a plurality of broomed out elements of said tension member extend into said central passage, resinous material is inserted into said central passage, combines with said tension member elements, and forms plugs within said cavity segments when said resinous material becomes hard.

* * * * *